(No Model.)
C. COUNCIL.
MARKER FOR CORN PLANTERS.
No. 505,266. Patented Sept. 19, 1893.
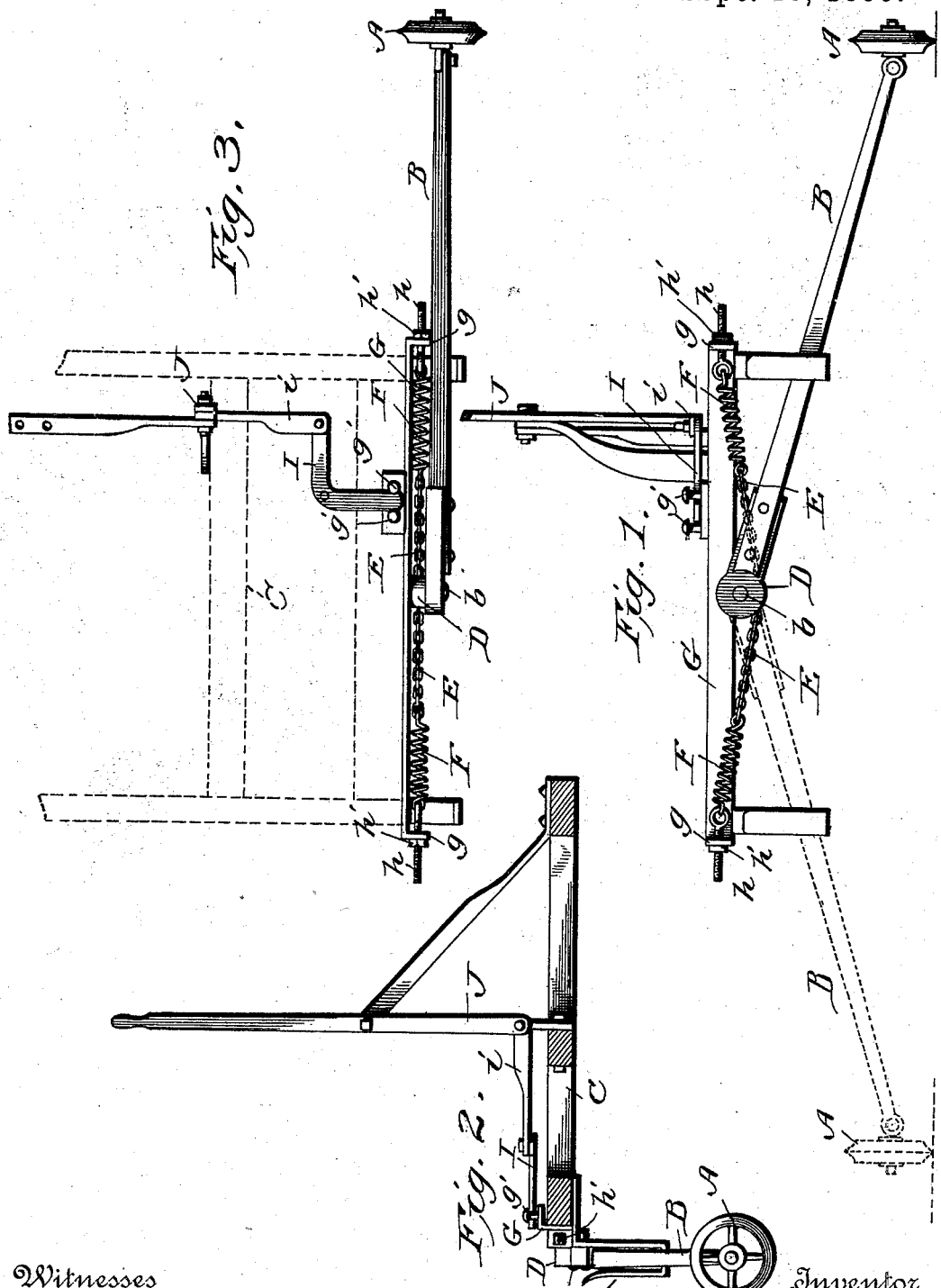

UNITED STATES PATENT OFFICE.

CLIFFORD COUNCIL, OF SHERMAN, ILLINOIS.

MARKER FOR CORN-PLANTERS.

SPECIFICATION forming part of Letters Patent No. 505,266, dated September 19, 1893.

Application filed June 7, 1893. Serial No. 476,846. (No model.)

*To all whom it may concern:*

Be it known that I, CLIFFORD COUNCIL, a citizen of the United States, residing at Sherman, in the county of Sangamon and State of Illinois, have invented certain new and useful Improvements in Markers for Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to markers for planters, and it has for its object the provision of means to enable the easy and expeditious changing of the markers position from one side of the planter to the other, at the end of a row, and to this end said invention consists in the mechanism having the construction and combination of parts hereinafter specified and illustrated in the annexed drawings, in which drawings—

Figure 1 is a rear elevation of my mechanism. Fig. 2 is a side elevation and Fig. 3 is a plan view of the same.

The marker A, in the form of a small roller, is journaled at the outer end of a bar or beam B, pivoted at its other end on a stud or pivot b, suitably secured to the planter frame C, a portion only of which is shown. Upon its pivotal end, said beam has a hub or drum D to which, at diametrically opposite points are attached two short sections of chain E, E passing partially around the drum on its under side and extending in opposite directions. Each chain E has its free end attached to a coiled spring F that in turn is connected to the end of a horizontal sliding bar G by means of an eye-bolt h that passes through a right angled extension g on said bar, and a nut h' on the threaded shank of the eye-bolt. The bolt and nut afford means for adjusting the tension of the springs F F.

The slide bar G is provided with two lugs or pins g', g', between and engaging which is one arm of a horizontally swinging bell-crank lever I whose other arm is connected by a link i, to a vertical hand lever J within convenient reach of the driver.

The operation of the mechanism is as follows:—The springs F, F having been adjusted so that they nearly balance the weight of the marker beam, the bar G on reaching the end of the row, is moved longitudinally by means of the hand lever J and the connections between them. The effect of this movement of the bar is to relax one spring F, (since the drum D is on a fixed pivot,) and to draw on or increase the tension of the other spring. This will result in the swinging upward of the marker-beam B through the agency of the latter spring. Preferably the bar G is moved only far enough to carry the marker to a vertical position, to enable the planter to be turned around for the return row, which latter being done, the movement of the bar is continued until the marker beam is carried past its center, whereupon its own weight will throw it completely over to the opposite side. In its descent however, the heretofore relaxed spring will be brought into play and serve to render the fall easy and without shock.

I wish it understood that I do not limit myself to the details of construction shown and described, but consider myself entitled to vary these without departure from the scope of my invention.

Having thus described my invention, what I claim to be new, and desire to secure by Letters Patent, is—

1. In combination, a swinging marker carrying arm, the opposing springs attached thereto and means to relax one spring and means to draw on or increase the tension of the other spring, substantially as described.

2. In combination, a pivoted marker-arm, the opposing springs attached thereto, the sliding bar connected to said springs, and means to move said bar to vary the stress of the springs, substantially as described and for the purpose specified.

3. In combination, a pivoted marker, its hub or drum, the two opposing springs connected to said drum, the sliding bar having adjustable connections with said springs, the bell-crank-lever to move said bar, and the hand lever connected to the bell-crank-lever, substantially as and for the purpose described.

In testimony whereof I affix my signature in presence of two witnesses.

CLIFFORD COUNCIL.

Witnesses:
ROBT. E. MCCLELLAND,
W. FRANK HUSSEY.